(12) United States Patent
Jeyarajaboopathy et al.

(10) Patent No.: US 11,971,806 B2
(45) Date of Patent: Apr. 30, 2024

(54) SYSTEM AND METHOD FOR DYNAMIC MONITORING OF CHANGES IN CODING DATA

(71) Applicant: BANK OF AMERICA CORPORATION, Charlotte, NC (US)

(72) Inventors: Nevetha Jeyarajaboopathy, Nagercoil (IN); Vinotha Ayyakkannu, Chennai (IN); Ramesh Reddi, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 130 days.

(21) Appl. No.: 17/678,457

(22) Filed: Feb. 23, 2022

(65) Prior Publication Data
US 2023/0267069 A1    Aug. 24, 2023

(51) Int. Cl.
G06F 9/44    (2018.01)
G06F 11/36    (2006.01)

(52) U.S. Cl.
CPC ...... *G06F 11/3636* (2013.01); *G06F 11/3612* (2013.01)

(58) Field of Classification Search
CPC .......... G06F 11/3636; G06F 11/3612
See application file for complete search history.

(56) References Cited

U.S. PATENT DOCUMENTS

| | | | |
|---|---|---|---|
| 6,466,931 B1 * | 10/2002 | Attaluri | G06F 16/24524 707/999.005 |
| 6,938,034 B1 * | 8/2005 | Kraft | G06F 40/194 |
| 11,372,640 B1 | 6/2022 | Bakardzhiev | |
| 11,410,594 B1 | 8/2022 | Chen | |
| 11,418,613 B2 | 8/2022 | White | |
| 11,429,384 B1 | 8/2022 | Navert | |
| 11,435,986 B2 | 9/2022 | Jaeger | |
| 11,481,200 B1 | 10/2022 | Huang | |
| 2009/0100004 A1 * | 4/2009 | Andrei | G06F 16/2453 |
| 2022/0012113 A1 | 1/2022 | Puri | |
| 2022/0129557 A1 | 4/2022 | Chan | |
| 2022/0179642 A1 | 6/2022 | Liang | |
| 2022/0236981 A1 | 7/2022 | Liang | |
| 2022/0263854 A1 | 8/2022 | Miller | |
| 2022/0269558 A1 | 8/2022 | Sullivan | |
| 2022/0269828 A1 | 8/2022 | Raman | |

(Continued)

*Primary Examiner* — Hang Pan
(74) *Attorney, Agent, or Firm* — Moore & Van Allen PLLC; Nicholas C. Russell

(57) ABSTRACT

Various systems, methods, and computer program products are provided for dynamically monitoring of changes in coding data. The method includes receiving an execution plan of a data model. The execution plan includes code including one or more processing steps of how data is transformed by the data model. The method also includes retrieving at least one stored code for the data model. The method further includes determining a code change determination value indicating the differences between the code of the data model received in the execution plan and the at least one stored code for the data model. The method further includes generating a code action based upon the code change determination value. The method also includes replacing the stored code for the data model with the code of the data model received in the execution plan in an instance the code change determination value is below a predetermined threshold.

20 Claims, 10 Drawing Sheets

(56) References Cited

U.S. PATENT DOCUMENTS

| | | |
|---|---|---|
| 2022/0318538 A1 | 10/2022 | Zhang |
| 2022/0334951 A1 | 10/2022 | Gevorkyan |
| 2022/0337593 A1 | 10/2022 | Burckhardt |
| 2022/0342803 A1 | 10/2022 | Fox |
| 2022/0351060 A1 | 11/2022 | Stump |
| 2022/0358190 A1 | 11/2022 | Baghani |
| 2022/0405091 A1* | 12/2022 | Mahanta .................. G06N 3/10 |
| 2023/0088784 A1* | 3/2023 | Negussie .............. G06F 11/008 717/102 |

\* cited by examiner

US 11,971,806 B2

SYSTEM AND METHOD FOR DYNAMIC MONITORING OF CHANGES IN CODING DATA

TECHNOLOGICAL FIELD

An example embodiment relates generally to analyzing data processing code changes, and more particularly, to monitoring of changes in coding data.

BACKGROUND

Applications use data from various sources, and it is difficult to monitor the data from each application in real-time, as currently most of the information necessary to analyze the data is not traceable. The increased speed of processing also now requires that any analysis to verify the data be completely in near real-time. Therefore, there exists a need for a system to facilitate high frequency processing.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for dynamically monitoring of changes in coding data is provided. The system includes at least one non-transitory storage device; and at least one processing device coupled to the at least one non-transitory storage device. The at least one processing device is configured to receive an execution plan of a data model. The execution plan comprises code including one or more processing steps of how data is transformed by the data model. The at least one processing device is also configured to retrieve at least one stored code for the data model. The at least one processing device is further configured to determine a code change determination value. The code change determination value indicates the amount of differences between the code of the data model received in the execution plan and the at least one stored code for the data model. The at least one processing device is still further configured to generate a code action based upon the code change determination value. The at least one processing device is also configured to replace the stored code for the data model with the code of the data model received in the execution plan in an instance the code change determination value is below a predetermined threshold.

In some embodiments the amount of differences between the code of the data model received in the execution plan and the at least one stored code for the data model is based on the differences in the processing steps between the code of the data model received in the execution plan and the at least one stored code for the data model during execution. In some embodiments, the code change determination value is determined by applying logistic regression machine learning model with the at least one stored code for the data model being used as a trained data set.

In some embodiments, the code action includes generating an event in an instance in which the code change determination value is below the given threshold. In some embodiments, the execution plan is received from at least one of an execution engine or a query processor. In some embodiments, at least one stored data model includes data model execution data that includes information relating to the execution of the data model. In some embodiments, the at least one processing device is further configured to create the execution plan based on an execution of the data model.

In another example embodiment, a computer program product for dynamically monitoring of changes in coding data is provided. The computer program product includes at least one non-transitory computer-readable medium having computer-readable program code portions embodied therein. The computer-readable program code portions include an executable portion configured to receive an execution plan of a data model. The execution plan includes code including one or more processing steps of how data is transformed by the data model. The computer-readable program code portions also include an executable portion configured to retrieve at least one stored code for the data model. The computer-readable program code portions further include an executable portion configured to determine a code change determination value. The code change determination value indicates the amount of differences between the code of the data model received in the execution plan and the at least one stored code for the data model. The computer-readable program code portions still further include an executable portion configured to generate a code action based upon the code change determination value. The computer-readable program code portions also include an executable portion configured to replace the stored code for the data model with the code of the data model received in the execution plan in an instance the code change determination value is below a predetermined threshold.

In some embodiments, the amount of differences between the code of the data model received in the execution plan and the at least one stored code for the data model is based on the differences in the processing steps between the code of the data model received in the execution plan and the at least one stored code for the data model during execution. In some embodiments, the code change determination value is determined by applying logistic regression machine learning model with the at least one stored code for the data model being used as a trained data set.

In some embodiments, the code action includes generating an event in an instance in which the code change determination value is below the given threshold. In some embodiments, the execution plan is received from at least one of an execution engine or a query processor. In some embodiments, at least one stored data model includes data model execution data that includes information relating to the execution of the data model. In some embodiments, the computer-readable program code portions include an executable portion configured to create the execution plan based on an execution of the data model.

In still another example embodiment, a computer-implemented method for dynamically monitoring of changes in coding data is provided. The method includes receiving an execution plan of a data model. The execution plan includes code including one or more processing steps of how data is transformed by the data model. The method also includes retrieving at least one stored code for the data model. The method further includes determining a code change determination value. The code change determination value indicates the amount of differences between the code of the data model received in the execution plan and the at least one stored code for the data model. Based upon the code change determination value, the method also includes generating a code action. The method further includes replacing the stored code for the data model with the code of the data model received in the execution plan in an instance the code change determination value is below a predetermined threshold.

In some embodiments, the amount of differences between the code of the data model received in the execution plan and the at least one stored code for the data model is based on the differences in the processing steps between the code of the data model received in the execution plan and the at least one stored code for the data model during execution. In some embodiments, the code change determination value is determined by applying logistic regression machine learning model with the at least one stored code for the data model being used as a trained data set. In some embodiments, the code action includes generating an event in an instance in which the code change determination value is below the given threshold.

In some embodiments, at least one stored data model includes data model execution data that includes information relating to the execution of the data model. In some embodiments, the method also includes creating the execution plan based on an execution of the data model.

Embodiments of the present disclosure address the above needs and/or achieve other advantages by providing apparatuses (e.g., a system, computer program product and/or other devices) and methods for dynamic monitoring of changes in coding data. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
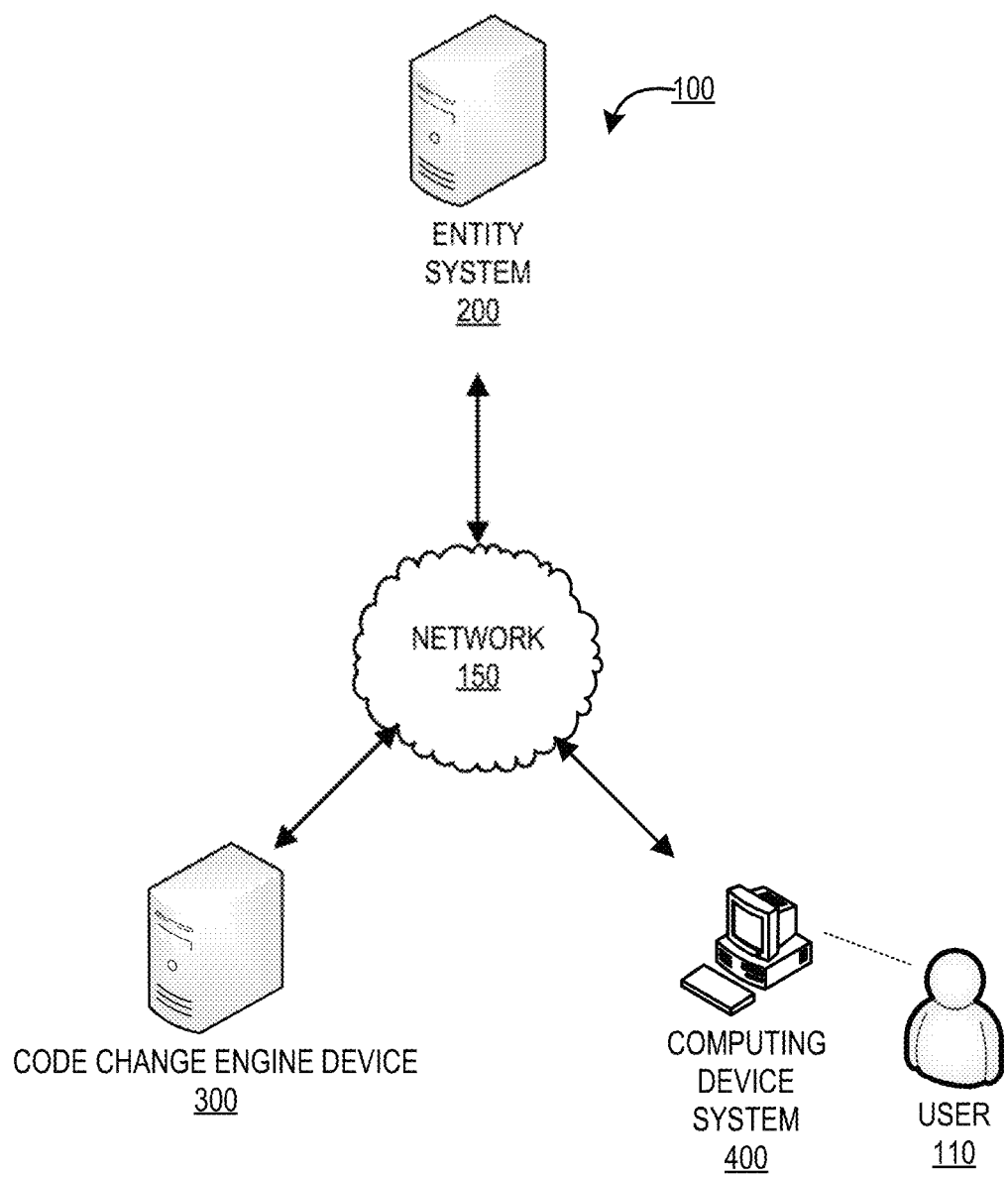
Figure 2:
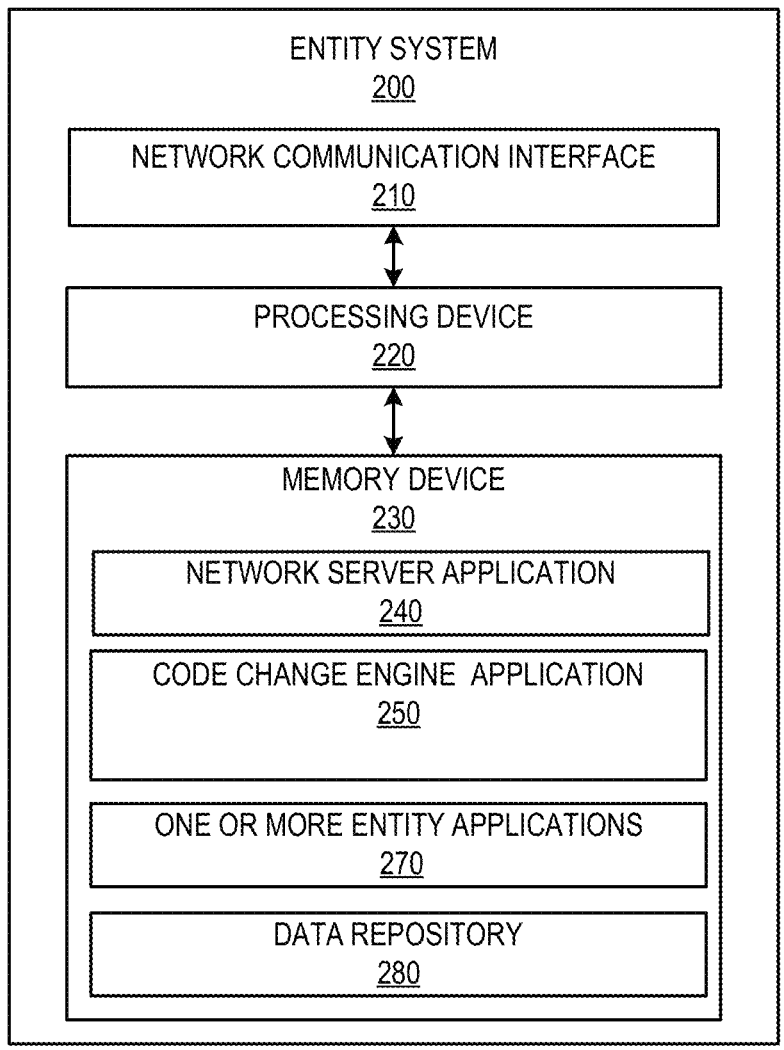
Figure 3:
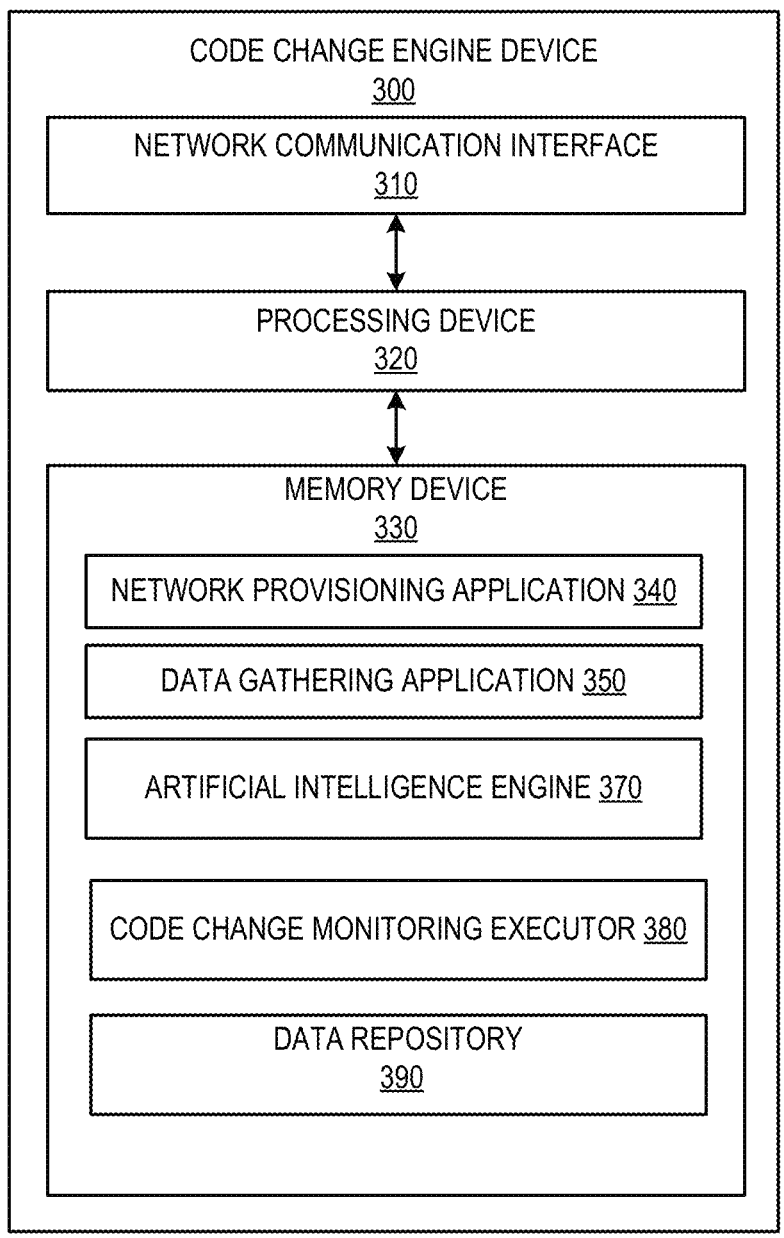
Figure 4:
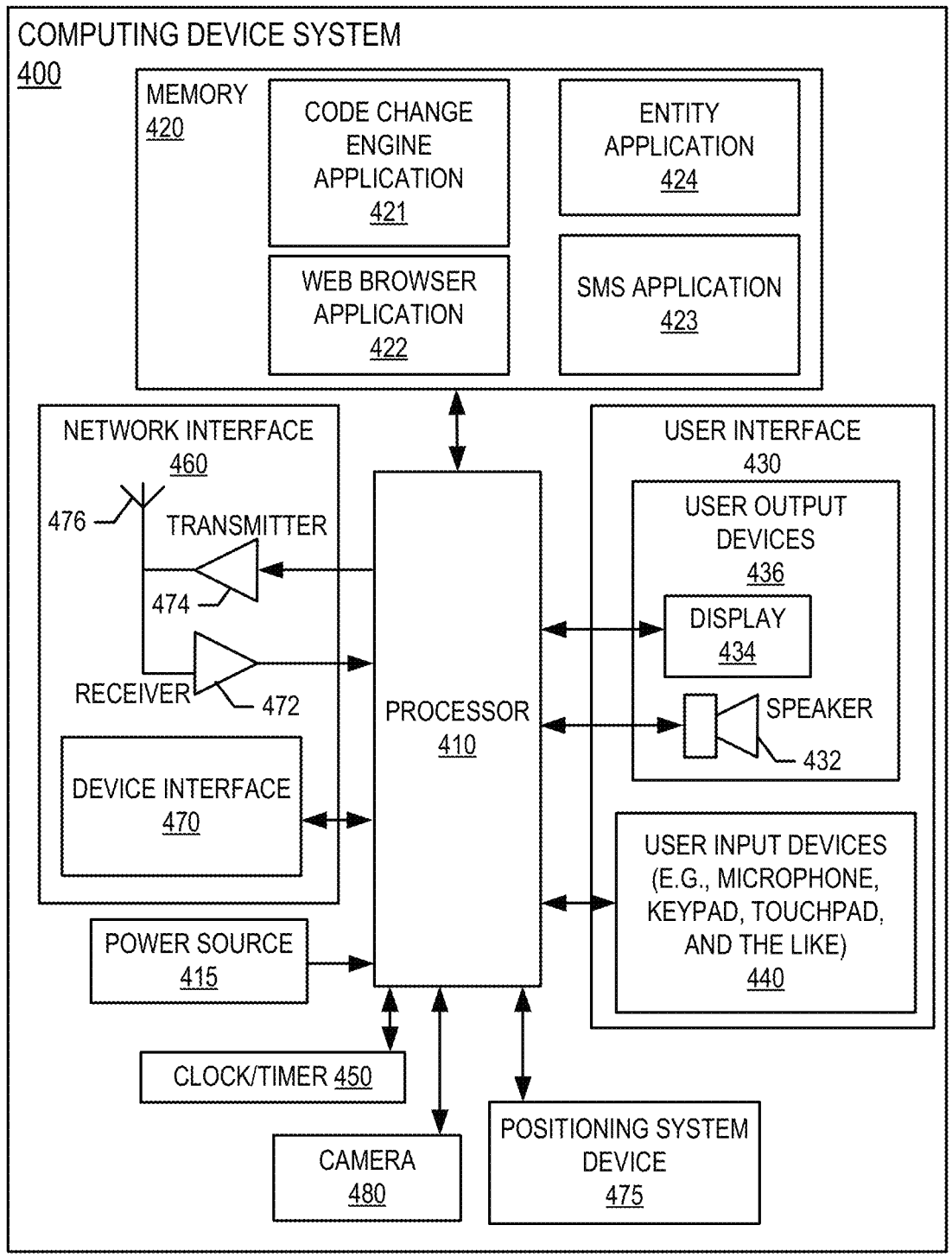
Figure 5:
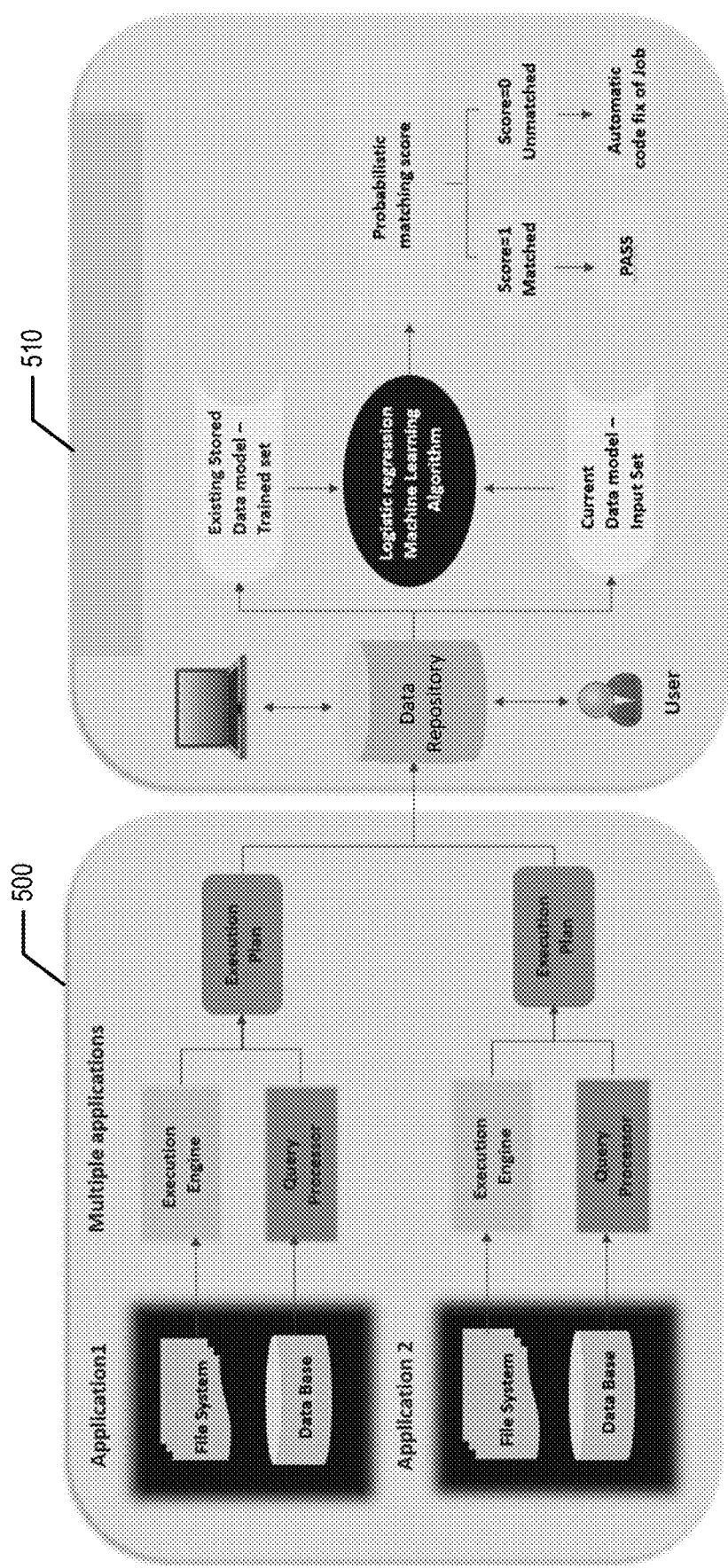
Figure 6:
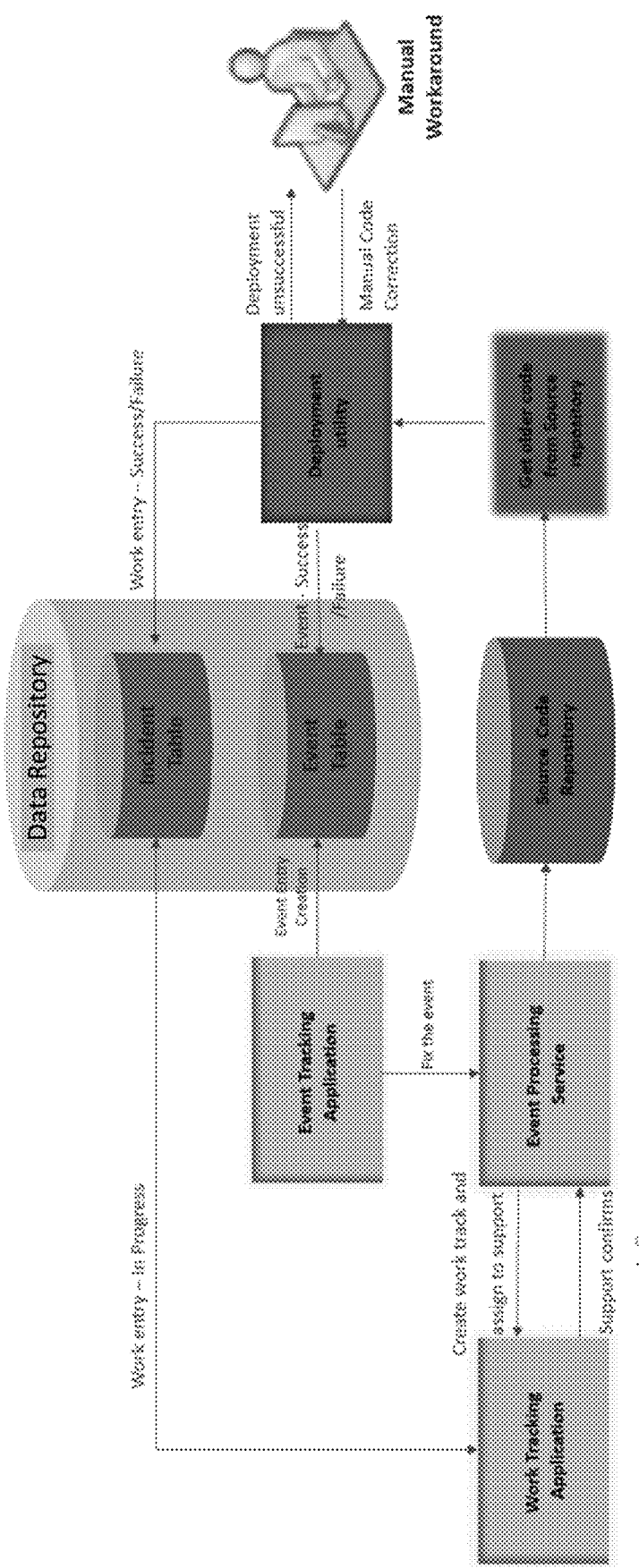
Figure 7:
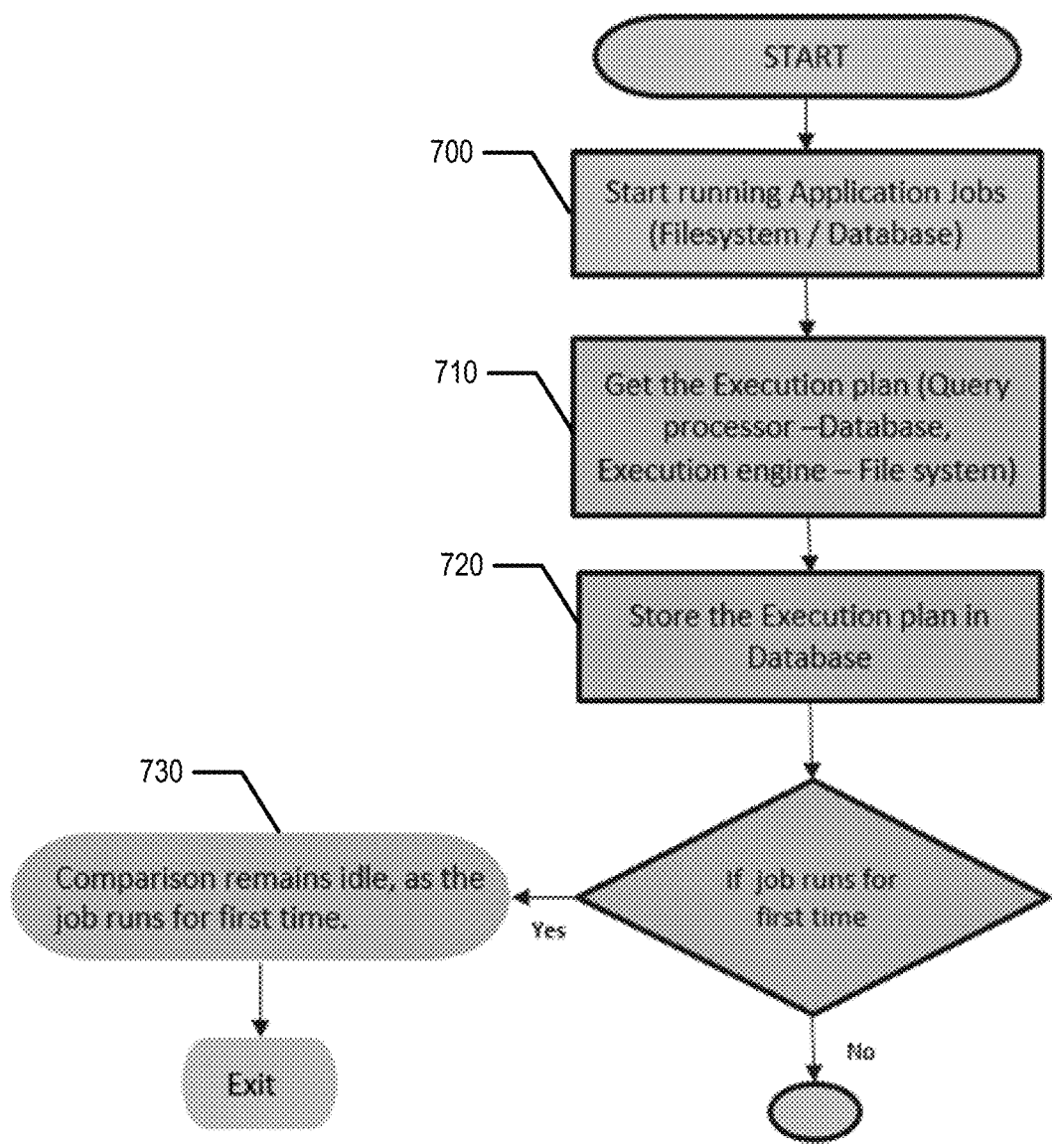
Figure 8:
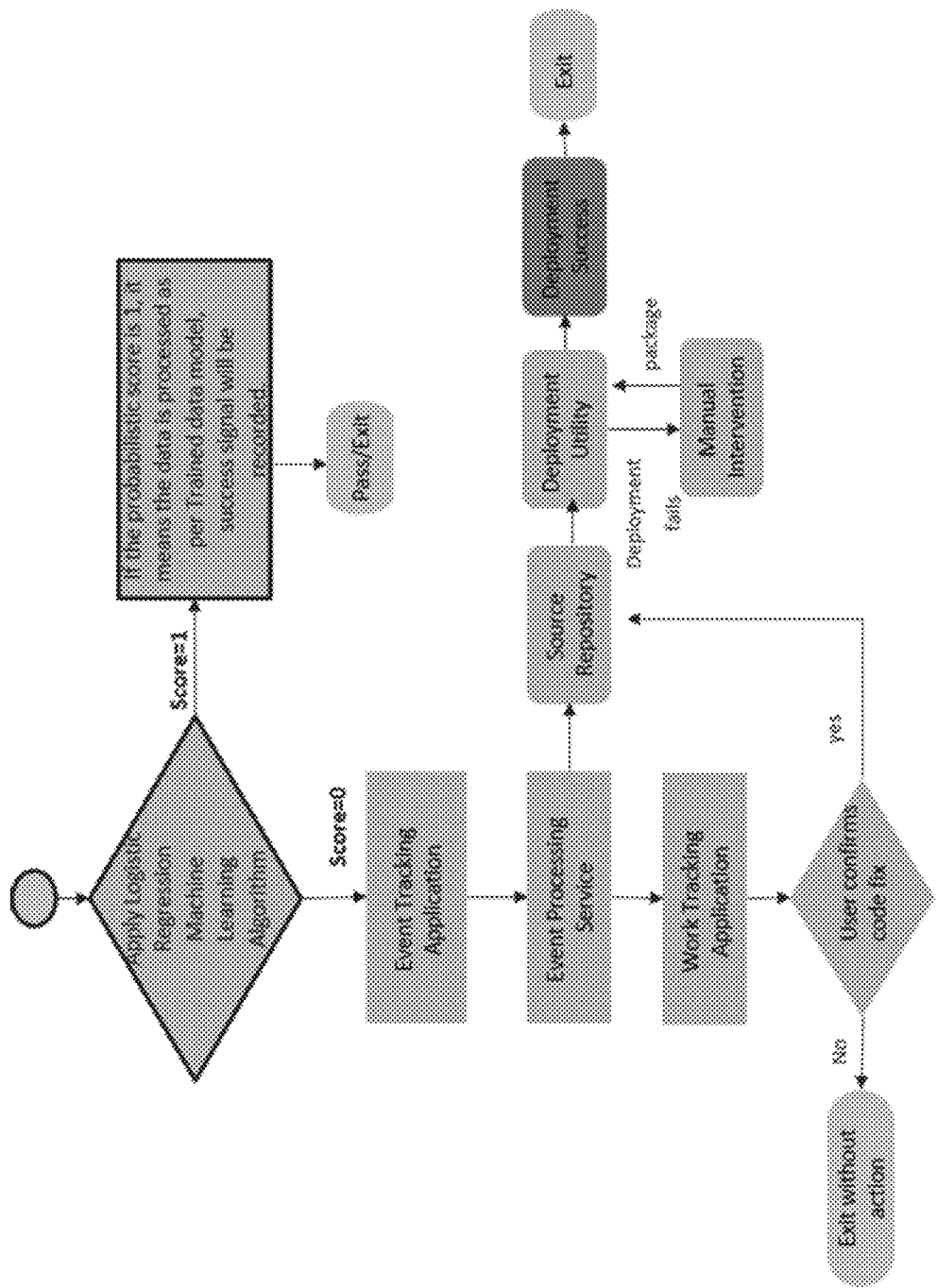
Figure 9:
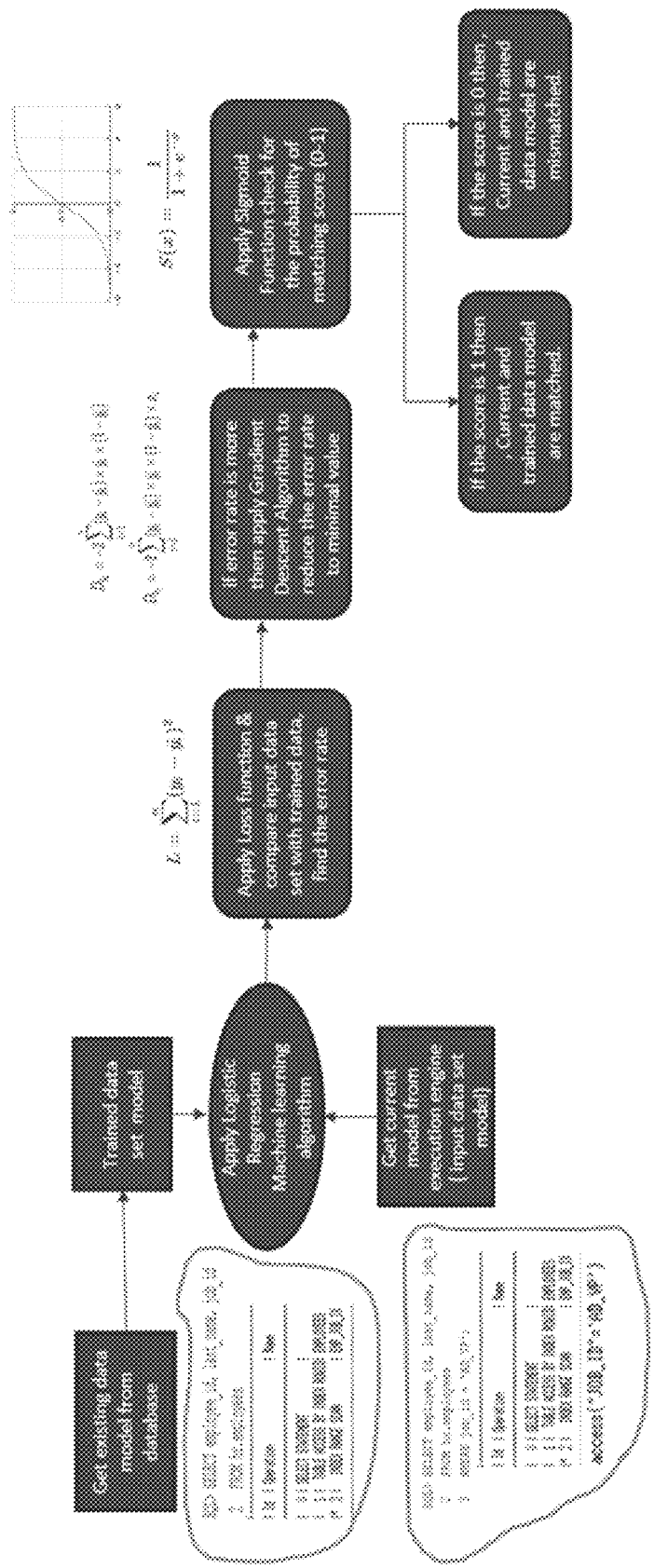
Figure 10:
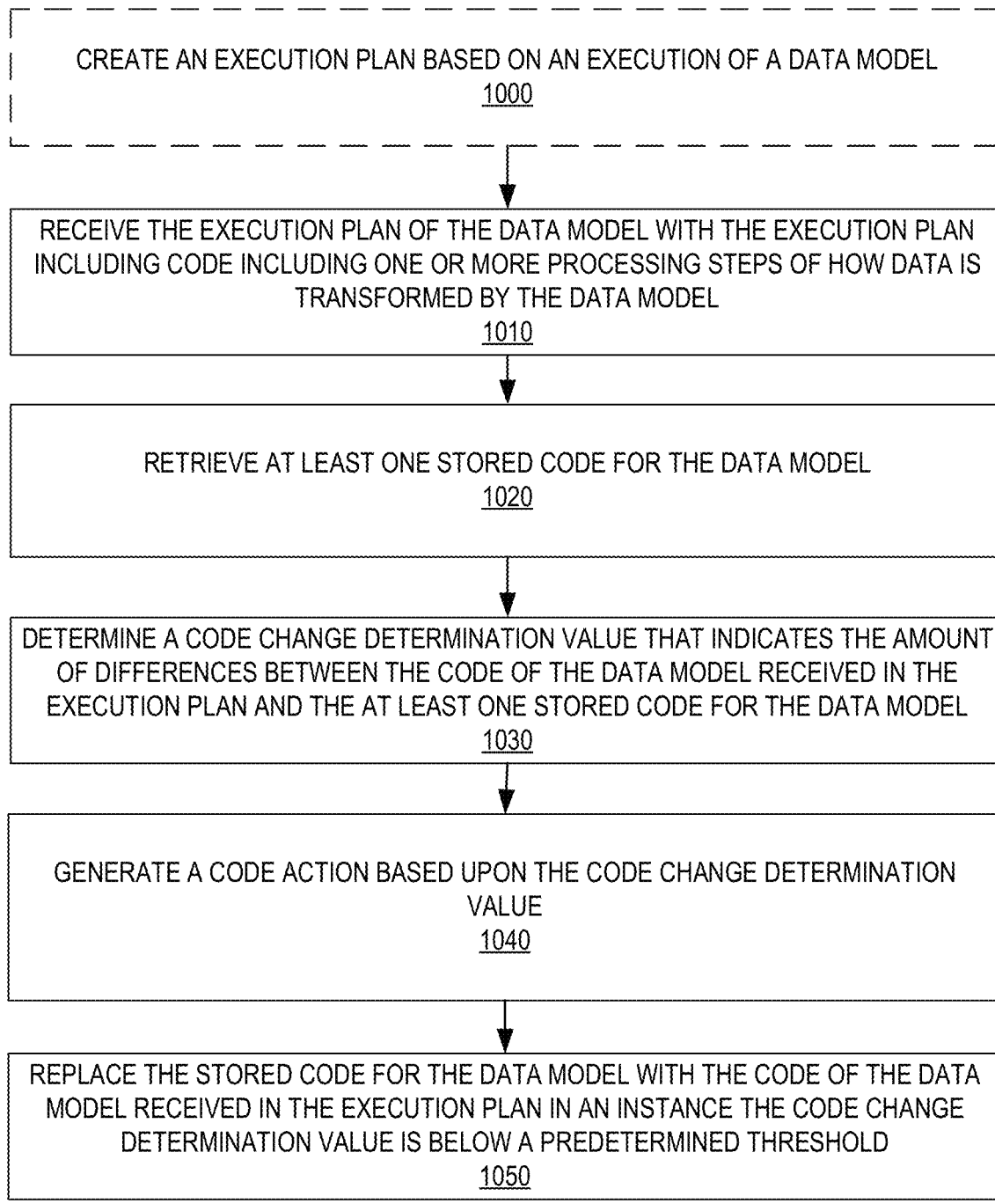

Having thus described embodiments of the disclosure in general terms, reference will now be made the accompanying drawings, wherein:

FIG. 1 provides a block diagram illustrating a system environment for dynamic monitoring of changes in coding data, in accordance with embodiments of the present disclosure;

FIG. 2 provides a block diagram illustrating the entity system 200 of FIG. 1, in accordance with embodiments of the present disclosure;

FIG. 3 provides a block diagram illustrating a code change engine device 300 of FIG. 1, in accordance with embodiments of the present disclosure;

FIG. 4 provides a block diagram illustrating the computing device system 400 of FIG. 1, in accordance with embodiments of the present disclosure; and FIG. 5 provides block diagram illustrating the system structure interacting with two applications in accordance with embodiments of the present disclosure;

FIG. 6 provides a block diagram illustrating the operations of the system used to review and update code changes in accordance with embodiments of the present disclosure;

FIGS. 7 and 8 provide flow diagrams illustrating the method of dynamic monitoring of changes in coding data in accordance with embodiments of the present disclosure;

FIG. 9 provides a block diagram illustrating an example use case of the system in accordance with embodiments of the present disclosure; and FIG. 10 illustrates a flow chart of a method of dynamically monitoring of changes in coding data.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

The accuracy of data for data processing is paramount for efficient processing. Data quality and data correctness can be difficult due to the use of data received from a third party. As such, it may currently be difficult or impossible to analyze and confirm the quality of data received before processing occurs. As such, a platform is susceptible to errors since any errors in data will cause errors to any processing. Currently there are no data quality checks on data received by a system to be processed and errors in data are only discovered when downstream errors occur.

Various embodiments of the present disclosure provide a system for dynamic monitoring of changes in coding data. In order to ensure data quality and/or correctness, the system of various embodiments uses an architecture that creates data comparison values of processing steps dynamically across application whenever data is exchanged. The system compares existing stored data models or information with current data models or information. In an instance a mismatch occurs between the existing stored data models and the current data models the system is configured to cause an alert for the current data model to be reviewed by a user (e.g., support team member or programmer). The system may recommend code changes to fix any issues and/or receive changes to the code from the user.

FIG. 1 provides a block diagram illustrating a system environment 100 for dynamic monitoring of changes in coding data. As illustrated in FIG. 1, the environment 100 includes a code change engine device 300, one or more server device(s) 500, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The code change engine device 300 is a system of the present disclosure for performing one or more process steps described herein. In some embodiments, the code change engine device 300 may be an independent system. In some embodiments, the code change engine device 300 may be a part of the entity system 200. For example, the methods discussed herein may be carried out by the entity system 200, the code change engine device 300, the computing device system 400, the server device(s) 500, and/or a combination thereof.

The server device(s) 500 are any devices that store, edit, or executes API configuration. Server device(s) 500 include user devices (e.g., computing device 400), source control systems, virtual servers, build machines, API hosting platforms, physical servers, and/or the like. The server device(s) may be equipped with a local module that logs any changes to API configuration. The server device also includes communication capabilities to spend the recorded logs to the code change engine device 300 for API diagnostics as discussed herein. The transmission of the logs may be via the network 150.

The code change engine device 300, the entity system 200, the computing device system 400, and the server device(s) 500 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the code change engine device 300 is configured to communicate information or instructions with the entity system 200, the computing device system 400, and/or the server device(s) 500 across the network 150. While the entity system 200, the code change engine device 300, the computing device system 400, and server device(s) are illustrated as separate components communicating via network 150, one or more of the components discussed here may be carried out via the same system (e.g., a single system may include the entity system 200 and the code change engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the code change engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a code change engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the code change engine application 250, the one or more entity application 270 to perform certain logic, data-extraction, and data-storing functions of the entity system 200 described herein, as well as communication functions of the entity system 200.

The network server application 240, the code change engine application 250, and the one or more entity applications 270 are configured to store data in the data repository 280 or to use the data stored in the data repository 280 when communicating through the network communication interface 210 with the code change engine device 300, and/or the computing device system 400 to perform one or more process steps described herein. In some embodiments, the entity system 200 may receive instructions from the code change engine device 300 via the code change engine application 250 to perform certain operations. The code change engine application 250 may be provided by the code change engine device 300. The one or more entity applications 270 may be any of the applications used, created, modified, facilitated, and/or managed by the entity system 200. The code change engine application 250 may be in communication with the code change engine device 300. In some embodiments, portions of the methods discussed herein may be carried out by the entity system 200.

FIG. 3 provides a block diagram illustrating the code change engine device 300 in greater detail, in accordance with various embodiments. The code change engine device 300 may include or be in communication with the central module and/or the analysis module discussed herein. The code change engine device 300 is configured to receive logs from local modules (e.g. local modules may be installed on the server device(s) 500).

As illustrated in FIG. 3, in one embodiment, the code change engine device 300 includes one or more processing devices 320 operatively coupled to a network communication interface 310 and a memory device 330. In certain embodiments, the code change engine device 300 is operated by an entity, such as a financial institution. In some embodiments, the code change engine device 300 is owned or operated by the entity of the entity system 200. In some embodiments, the code change engine device 300 may be an independent system. In alternate embodiments, the code change engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the code change engine device 300 described herein. For example, in one embodiment of the code change engine device 300, the memory device 330 includes, but is not limited to, a network provisioning application 340, a data gathering application 350, an artificial intelligence engine 370, a code change monitoring executor 380, and a data repository 390 comprising any data processed or accessed by one or more applications in the memory device 330. The computer-executable program code of the network provisioning application 340, the data gathering application 350, the artificial intelligence engine 370, and the code change monitoring executor 380 may instruct the processing device 320 to perform certain logic, data-processing, and data-storing functions of the code change engine device 300 described herein, as well as communication functions of the code change engine device 300.

The network provisioning application 340, the data gathering application 350, the artificial intelligence engine 370, and the code change monitoring executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the code change monitoring executor 380 may store the data extracted or received from the entity system 200, and the computing device system 400 in the data repository 390. In some embodiments, the network provisioning application 340, the data gathering application 350, the artificial intelligence engine 370, and the code change monitoring executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 of various embodiments may be capable of rendering an API configuration.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a code change engine application 421, entity application 424. These applications also typically instructions to a graphical user interface (GUI) on the display 430 that allows the user 110 to interact with the entity system 200, the code change engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the code change engine application 421 provided by the code change engine device 300 allows the user 110 to access the code change engine device 300. In some embodiments, the entity application 424 provided by the entity system 200 and the code change engine application 421 allow the user 110 to access the functionalities provided by the code change engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Referring now to FIG. 5, a block diagram illustrating the system structure interacting with two applications in accordance with various embodiments is provided. As shown, multiple applications may be in communication with the system. Application typically process data either through file system or else through database queries. In an instance in which an application job processes data by querying the database, then each database may have a query processor, from there we will get the execution plan. The execution plan has the detailed steps of how the data is getting transformed for each column. In an instance in which an application job processes data from file system through any tool, then the respective tool may have an execution engine. In such an instance, the execution engine will also generate an execution plan. The operations shown in Block 500 may be carried out by a user device 400, shown in FIG. 1. Like the execution plan from the query processor, the execution plan has the detailed steps of how the data is getting transformed for each column. The system may receive the execution plan of all data processing and get it stored in a database (e.g., Provenance Database) as data model. The box 510 may include the operations performed by a code change engine device 300 and/or an entity system 200.

Upon storing the execution plan, the data model can be queried by a user and/or another processor (e.g., an application for analytical purpose, data governance purpose, and/or the like). The result of the queries can be shared to other users and/or processors to understand the data flow and transformation steps.

Once the execution plan is stored, it can be compared with the existing data model. The comparison may be completed using a logistic regression machine learning algorithm. In such an instance, the logistic regression machine learning algorithm keeps the existing data model as trained data and current data model as input data, in order to predict the probability of match, to make sure whatever data processed in current run is as per the expected logic (existing data model) or not.

Based on the comparison of the existing data model and the current data model, the system can determine whether any changes have been made. In an instance changes are detected, the system may cause a transmission of an alert that can activate the automated code fix discussed herein.

Referring now to FIG. 6, a block diagram illustrating the operations of the system used to review and update code changes in accordance with various embodiments is provided. FIG. 6 illustrates the operations in an instance in which an alert has been triggered by the system indicating a code change. In an instance in which an alert has been raised, a code change event may be created within a data repository of the system (e.g., database). The code change event may have details of what column transformation has changed, what was the transformation steps in existing data model, and how that is different from current data model, along with the respective job name. The code change event may also cause the system to trigger Event processing service.

In an instance a code change event is created, the system is configured to determine one or more automated changes to the code (e.g., to fix any issues with the code). Manual confirmation may also be received from a user (e.g., a programmer) before the system attempts an automated revision to the code.

In an instance the event processing service is triggered, the event processing service may create an incident having the details of the event. Also, the event processing service may request a user to provide confirmation (e.g., for the user to confirm and elevate the threat level). The system may be configured with a source code version control tool that contains all code of project and the system may be configured to search for the reported job name as per event, and check if the code had recent changes. In an instance there are any data models with mismatch in the transformation logic steps then it should be because of recent code change of the job. As such, the system may analysis the most recent past code and revert the code back to the past code. The system may notify the user of the results (e.g., whether the system was able to automatically fix the issues with the code).

FIGS. 7 and 8 are flow diagrams that illustrate the operations discussed above. As an application or process is being ran (Block 700), the execution plan is recorded and then received by the system (Block 710). The execution plan may be stored in a database (Block 720) for the operations discussed herein. If the application or process is being executed for the first time, there is no comparison to previous code (as shown in Block 730). If the job is not being executed for the first time, then the operations of FIG. 8 may be carried out by the code change engine device 300. Additional operations are shown in FIG. 8, which includes applying a machine learning algorithm (e.g., a logistic regression machine learning algorithm).

Referring now to FIG. 9, a block diagram illustrating an example use case of the system in accordance with various embodiments is provided. As show, the system may retrieve the existing data model from a database and use the existing data model as trained data set model. Additionally, the system may receive the current data model from a database and keep that as input data set model. The system then applies a logistic regression Machine Learning Algorithm, which outputs a probabilistic score of the similarities between the input data model and the trained data model. Said algorithm may use a loss function, to find the error rate of comparison results, a 'Gradient Descent Algorithm', to reduce the error rate to minimal value, and also apply a 'Sigmoid function' to get the resultant value between 0 and 1. In an instance in which the score is 1, then the input data model matched with the trained data model and in an instance in which the score is 0, then the input data model is not matched with the trained data model. The logistic regression machine learning algorithm may be used to determine the code change determination value discussed below in reference to FIG. 10.

Referring now to FIG. 10, a method for dynamically monitoring of changes in coding data is provided. The method may be carried out by a system discussed herein (e.g., the entity system 200, the code change engine device 300, and/or the computing device system 400). An example system may include at least one non-transitory storage device and at least one processing device coupled to the at least one non-transitory storage device. In such an embodiment, the at least one processing device is configured to carry out the method discussed herein.

Referring now to optional Block 1000 of FIG. 10, the method includes creating an execution plan based on an execution of a data model. The execution plan includes the processing steps of how data is being transformed. The execution plan may include the code of the processes. The execution plan may be recorded by the device on which the processes are being carried out. The execution plan may be storable as a data model. The data model includes information relating to the execution plan, such as run time data and other processing data. As indicated herein, the device on which the process is being carried out may be in communication or a part of the system discussed herein. For example, the device on which the process is being carried out may be a computing device system 400 or an entity system 200, and as such, may be in communication with the code change engine device 300. The execution plans are recorded from either an execution engine or a query processor, as discussed above in reference to FIG. 5.

Referring now to Block 1010 of FIG. 10, the method includes receiving the execution plan of the data model with the execution plan including code including one or more processing steps of how data is transformed by the data model. The execution plan includes statistics relating to a process. The execution plan can also include the code of the data model itself. The execution plan may be received (e.g., by the code change engine 300) from the device on which the process is being carried out.

Referring now to Block 1020 of FIG. 10, the method includes retrieving at least one stored code for the data model. The stored code for the data model may also include one or more statistics relating to the process of the data model (e.g., statistics on run time and/or other processing statistics). The stored code for the data model may be stored from a previous execution plan of the same or similar data model. For example, the code change engine device 300 may store the execution plan (e.g., the data model of the process) at the completion of the operations discussed herein and use said execution plan as a stored code for future operations. As discussed below, the stored code of the data model may be used as a trained data set in the use of machine learning operations.

Referring now to Block 1030 of FIG. 10, the method includes determining a code change determination value that indicates the amount of differences between the code of the data model received in the execution plan and the at least one stored code for the data model. The amount of differences between the code of the data model received in the execution plan and the at least one stored code for the data model is based on the differences in the processing steps between the code of the data model received in the execution plan and the at least one stored code for the data model during execution.

The code change determination value may be determined via machine learning. For example, the code change determination value may be determined using a logistic regression machine learning algorithm, as shown in FIG. 9. In such an instance, the at least one stored code of the data model can be used as a trained set and the execution plan may be used as the input data set. The code change determination value indicates any differences between the execution plan and the stored code (e.g., a code change determination value close to 1 may indicate little to no differences between the trained set and the input data set). The system may have a predetermined threshold to indicate the similarities and/or differences between the execution plan and the stored code.

Referring now to Block 1040 of FIG. 10, the method includes generating a code action based upon the code change determination value. The code action may be any action, automated or manual, that attempts to update the code of the execution plan based on the code change determination value. The code action may be causing a notification to a user device to allow a user to review the code relating to the execution plan. For example, the notification may indicate that the execution plan differs from the stored code, allowing for the user to review the differences if necessary.

The code action may also include generating an event in an instance in which the code change determination value is below the given threshold. An event may be an indication that a code change has occurred and may begin a process for review of said change. The review of the code change may be at least partially automated, or manual.

Referring now to Block 1050 of FIG. 10, the method includes replacing the stored code for the data model with the code of the data model received in the execution plan in an instance the code change determination value is below a predetermined threshold. In some embodiments, the stored code for the data model may be replaced by the newly received code of the execution plan. Alternatively, the code of the execution plan may be stored along with other previous data models. Other metadata for the data model may also be included along with the code of the execution plan. The stored code can be used in future operations.

An example use case of the operations discussed in reference to FIG. 10 includes monitoring for code errors on a website. For example, a user may be attempting to apply for a credit card and the system may compare the result of an automated application decision with results from previous applications. As such, the system is configured to identify the code change and identify any potential remedies to the code. The system may also cause a transmission of a notification to a user to review the code change and either approve or decline said code change.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for dynamically monitoring of changes in coding data, the system comprising:
   at least one non-transitory storage device; and
   at least one processing device coupled to the at least one non-transitory storage device, wherein the at least one processing device is configured to:
   receive an execution plan of a data model, wherein the execution plan comprises code including one or more processing steps of how data is transformed by the data model;
   retrieve at least one stored code for the data model;
   determine a code change determination value, wherein the code change determination value indicates the amount of differences between the code of the data model received in the execution plan and the at least one stored code for the data model;
   based upon the code change determination value, generate a code action;
   determine a code change event has occurred based on the code change determination value;
   automatically update the execution plan of the data model in response to determining the code change event has occurred, wherein at least a portion of the code of the execution plan is replaced with at least a portion of the at least one stored code for the data model; and
   update the at least one stored code for the data model to include the code received in the execution plan in an instance the code change determination value is below a predetermined threshold.

2. The system of claim 1, wherein the amount of differences between the code of the data model received in the execution plan and the at least one stored code for the data model is based on the differences in the processing steps between the code of the data model received in the execution plan and the at least one stored code for the data model during execution.

3. The system of claim 1, wherein the code change determination value is determined by applying logistic regression machine learning model with the at least one stored code for the data model being used as a trained data set.

4. The system of claim 1, wherein the code action comprises generating an event in an instance in which the code change determination value is below the given threshold.

5. The system of claim 4, wherein the execution plan is received from at least one of an execution engine or a query processor.

6. The system of claim 1, wherein the at least one stored data model for the data model comprises data model execution data that includes information relating to the execution of the data model.

7. The system of claim 1, wherein the at least one processing device is further configured to create the execution plan based on an execution of the data model.

8. A computer program product for dynamically monitoring of changes in coding data, the computer program product comprising at least one non-transitory computer-readable medium having computer-readable program code portions embodied therein, the computer-readable program code portions comprising one or more executable portion configured to:
receive an execution plan of a data model, wherein the execution plan comprises code including one or more processing steps of how data is transformed by the data model;
retrieve at least one stored code for the data model;
determine a code change determination value, wherein the code change determination value indicates the amount of differences between the code of the data model received in the execution plan and the at least one stored code for the data model;
generate a code action based upon the code change determination value;
determine a code change event has occurred based on the code change determination value;
automatically update the execution plan of the data model in response to determining the code change event has occurred, wherein at least a portion of the code of the execution plan is replaced with at least a portion of the at least one stored code for the data model; and
update the at least one stored code for the data model to include the code received in the execution plan in an instance the code change determination value is below a predetermined threshold.

9. The computer program product of claim 8, wherein the amount of differences between the code of the data model received in the execution plan and the at least one stored code for the data model is based on the differences in the processing steps between the code of the data model received in the execution plan and the at least one stored code for the data model during execution.

10. The computer program product of claim 8, wherein the code change determination value is determined by applying logistic regression machine learning model with the at least one stored code for the data model being used as a trained data set.

11. The computer program product of claim 8, wherein the code action comprises generating an event in an instance in which the code change determination value is below the given threshold.

12. The computer program product of claim 11, wherein the execution plan is received from at least one of an execution engine or a query processor.

13. The computer program product of claim 8, wherein the at least one stored data model for the data model comprises data model execution data that includes information relating to the execution of the data model.

14. The computer program product of claim 8, wherein the executable portion are also configured to create the execution plan based on an execution of the data model.

15. A computer-implemented method for dynamically monitoring of changes in coding data, the method comprising:
receiving an execution plan of a data model, wherein the execution plan comprises code including one or more processing steps of how data is transformed by the data model;
retrieving at least one stored code for the data model;
determining a code change determination value, wherein the code change determination value indicates the amount of differences between the code of the data model received in the execution plan and the at least one stored code for the data model;
based upon the code change determination value, generating a code action;
determine a code change event has occurred based on the code change determination value;
automatically update the execution plan of the data model in response to determining the code change event has occurred, wherein at least a portion of the code of the execution plan is replaced with at least a portion of the at least one stored code for the data model; and
update the at least one stored code for the data model to include the code received in the execution plan in an instance the code change determination value is below a predetermined threshold.

16. The method of claim 15, wherein the amount of differences between the code of the data model received in the execution plan and the at least one stored code for the data model is based on the differences in the processing steps between the code of the data model received in the execution plan and the at least one stored code for the data model during execution.

17. The method of claim 15, wherein the code change determination value is determined by applying logistic regression machine learning model with the at least one stored code for the data model being used as a trained data set.

18. The method of claim 15, wherein the code action comprises generating an event in an instance in which the code change determination value is below the given threshold.

19. The system of claim 1, wherein the at least one stored data model for the data model comprises data model execution data that includes information relating to the execution of the data model.

20. The system of claim 1, further comprising creating the execution plan based on an execution of the data model.

* * * * *